United States Patent [19]

Sano et al.

[11] Patent Number: 4,935,821
[45] Date of Patent: Jun. 19, 1990

[54] IMAGE PROCESSING APPARATUS FOR MULTI-MEDIA COPYING MACHINE

[75] Inventors: Masaki Sano; Yoshiaki Hanyu, both of Tokyo; Nobuharu Takahashi, Kawasaki, all of Japan

[73] Assignee: Ricoh Company, Ltd., Tokyo, Japan

[21] Appl. No.: 231,395

[22] Filed: Aug. 12, 1988

[30] Foreign Application Priority Data

| Aug. 13, 1987 | [JP] | Japan | 62-200973 |
| Oct. 27, 1987 | [JP] | Japan | 62-269184 |
| Oct. 28, 1987 | [JP] | Japan | 62-270402 |
| Jun. 3, 1988 | [JP] | Japan | 63-135613 |

[51] Int. Cl.⁵ .............................................. H04N 1/40
[52] U.S. Cl. .................................. 358/427; 358/261.3
[58] Field of Search ............... 358/282, 256, 285, 401, 358/427, 403, 261.3

[56] References Cited

U.S. PATENT DOCUMENTS

| 4,251,821 | 2/1981 | Kimura | 358/285 |
| 4,506,342 | 3/1985 | Yamamoto | 358/403 |
| 4,587,633 | 5/1986 | Wang | 358/256 |
| 4,604,653 | 8/1986 | Shimizu | 358/403 |
| 4,607,290 | 8/1986 | Murakami | 358/426 |
| 4,614,978 | 9/1986 | Doster | 358/263 |
| 4,635,050 | 1/1987 | Grothe | 340/734 |
| 4,701,805 | 10/1987 | Maeshima | 358/282 |
| 4,706,126 | 11/1987 | Kondo | 358/256 |
| 4,723,173 | 2/1988 | Tanioka | 358/282 |
| 4,727,435 | 2/1988 | Otani | 358/256 |
| 4,760,458 | 7/1988 | Watanabe | 358/256 |

FOREIGN PATENT DOCUMENTS

0166654  7/1987  Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

An image processing apparatus applicable to a multi-media copying machine with which multiple different recording media are usable includes a scanner for reading a document image and converting it into an electrical image signal, a floppy disk drive, an MPU and other controllers, and a printer for printing out an image on paper. The apparatus has not only a document-to-paper copying function but also a document-to-disk copying function and a disk-to-paper copying function.

25 Claims, 16 Drawing Sheets

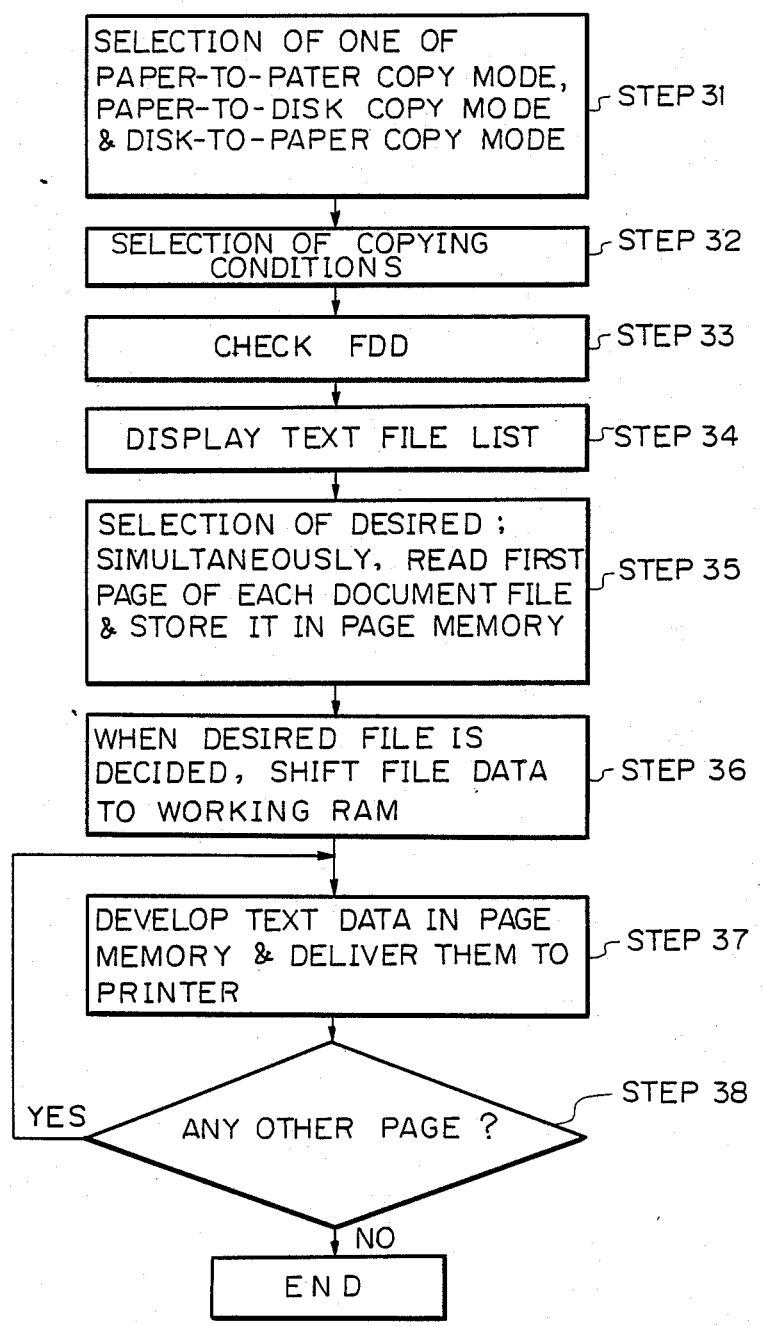

IMAGE PROCESSING APPARATUS FOR MULTI-MEDIA COPYING MACHINE

BACKGROUND OF THE INVENTION

The present invention relates to an image processing apparatus and, more particularly, to an image processing apparatus applicable to a multi-media copying machine with which multiple recording media are usable.

A recent achievement in the realm of imaging art is a multi-media copying machine having not only the capability of reproducing image data of an original document on a paper, which is the major capability of an ordinary digital copier, but also the capability of copying image data recorded on one of a paper and another kind of recording medium such as a floppy disk. With this type of copier, it is possible to store images (including characters) which are read from an original document by a scanner in, for example, a floppy disk and reproduce them on any desired number of papers as needed and to allow such a floppy disk to be used with another copier for reproducing the image data on papers. Another possibility is reproducing data recorded by a different kind of data processing equipment (e.g. computer, word processor or work station) by using the copier.

However, in a work station or any other system of similar level, the amount of raster image data read from an original document by a scanner is often too large to be accommodated in a floppy disk, as understood from the fact that such data are usually stored in a mass storage such as a magnetic tape or an optical file. Even with a copier, if a great number of documents are stored in a floppy disk to be printed out on papers as needed, it is possible to make the most of the functions of a multi-media copier. However, the capacity of a single floppy disk available at the present stage of technology is not great enough to accommodate raster images which are read from a document. Furthermore, in the case that such a multi-media copier is operated to reproduce data stored in a floppy disk on a paper, a prerequisite is that the interval between the instant of insertion of a floppy disk and the instant of print-out be as short as possible to enhance efficient operations.

SUMMARY OF THE INVENTION

It is therefore an object of the present invention to provide an image processing apparatus applicable to a multi-media copying machine which realizes copying from an original document to an external storing medium and printing from an external storing medium to a paper.

It is another object of the present invention to provide an image processing apparatus applicable to a multi-media copying machine which allows a large amount of image data to be stored in a single external storing medium.

It is another object of the present invention to provide an image processing apparatus applicable to a multi-media copying machine which promotes the ease of rotation, magnification change and other similar editing operations of a document or a drawing.

It is another object of the present invention to provide an image processing apparatus applicable to a multi-media copying machine which enhances efficient operations by reducing the interval between the instant of insertion of an external storing medium into an external store device and the instant of print-out.

It is another object of the present invention to provide an image processing apparatus applicable to a multi-media copying machine which prevents image quality from being degraded due to transfer copying by causing vector data to be transferred between external storing media.

An image processing apparatus of the present invention comprises an image reader for reading image data from an original document, an external store for writing the image data read by the image reader in an external storing medium and reading image data out of the external storing medium, an image forming unit for forming an image on a paper in response to image data which are read by the image reader or by the external store, and an image control for controlling the flow of image data between the image reader, external store, and image forming unit. The image control comprises a fixed store for converting the image data and then outputting the converted data at least when image data are to be outputted from the image reader to the external store and when image data are to be outputted from the external store to the image forming unit, and an image store for temporarily storing the part of the image data which are not need to be converted when the rest of the image data do read out of the external store and converted.

BRIEF DESCRIPTION OF THE DRAWINGS

The above and other objects, features and advantages of the present invention will become more apparent from the following detailed description taken in conjunction with the accompanying drawings in which:

FIG. 16 is a flowchart demonstrating an operation for reducing the interval between the instant of insertion of a floppy disk and the instant of print-out of a document.

DESCRIPTION OF THE PREFERRED EMBODIMENTS

Preferred embodiments of the image processing apparatus in accordance with the present invention will be described with reference to the accompanying drawings. In the following description, the external storing medium is assumed to be a floppy disk by way of example.

Figure 1:
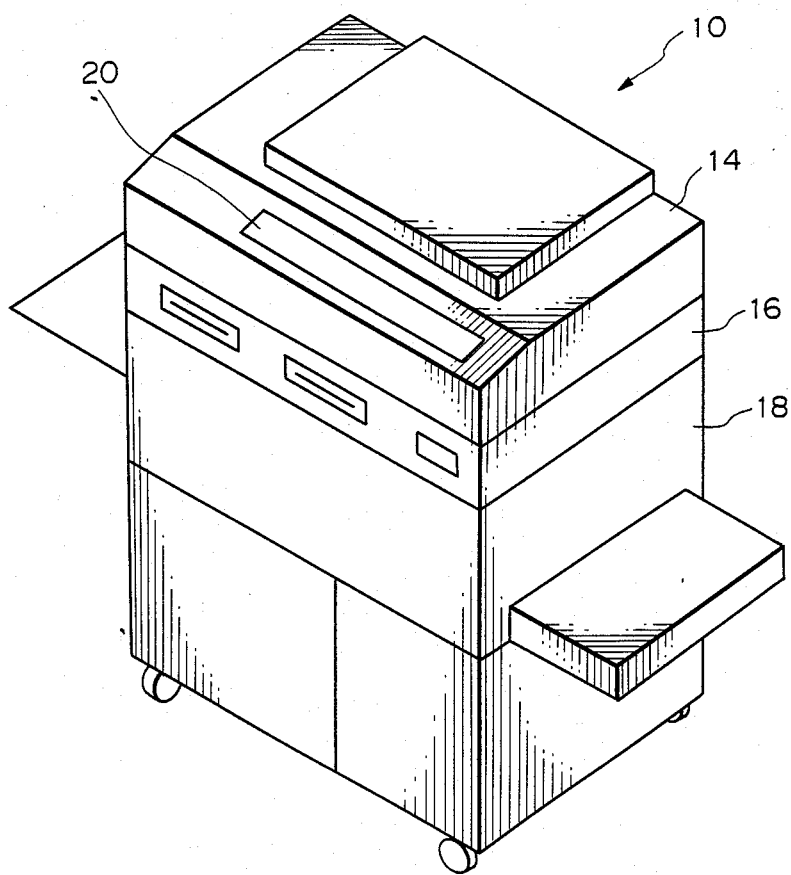
FIG. 1 is a perspective view of a multi-media copying machine to which an image processing apparatus of the present invention is applied.
Figure 2:
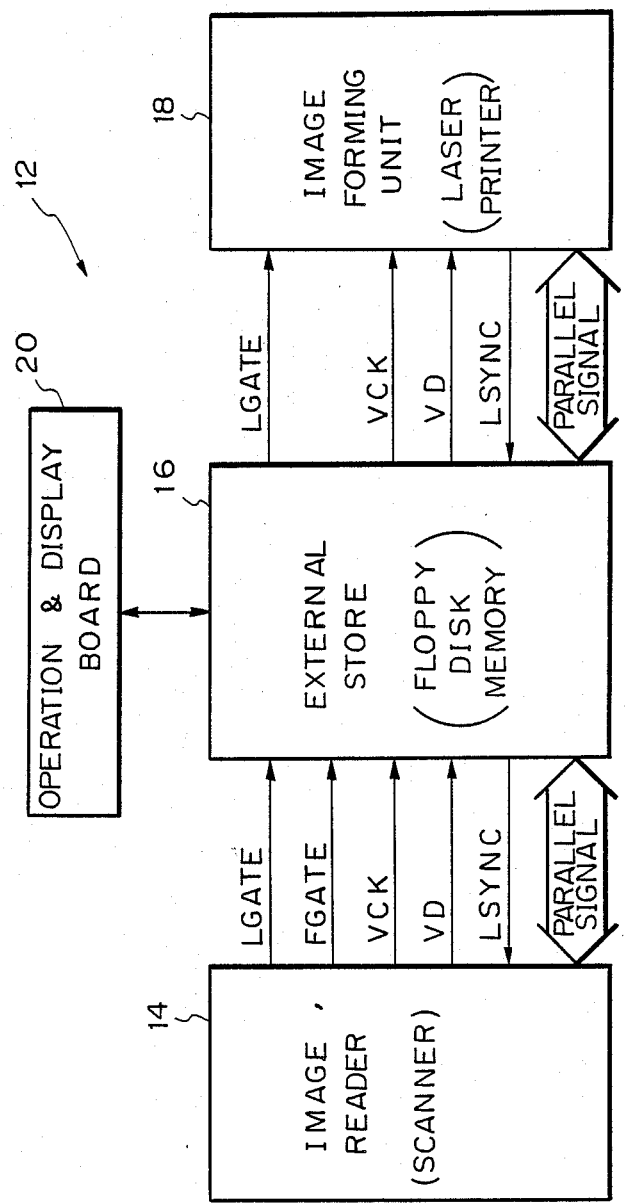
FIG. 2 is a schematic block diagram showing a control system installed in the copier of FIG. 1.

Referring to FIG. 1, a multi-media copying machine to which the apparatus of the present invention is applied is shown and generally designated by the reference numeral 10. FIG. 2 shows in a block diagram a control system which is installed in the copying machine. As shown, the control system 12 generally comprises an image reader (scanner) 14, an external store (floppy disk memory or FDM) 16, an image forming device (printer) 18, and an operation and display board 20. Although referred to as an "external" memory, the floppy disk is physically present within the unit 10 along with the scanner and printer. Serving as an input section of the copier 10, the scanner 14 converts image data associated with an original document into an electric signal (image signal) by charge-coupled devices (CCDs) or similar imaging devices. The original document is laid on a glass platen (not shown) of the copier 10. The FDM 16 is adapted to record the image signal from the scanner 14 and reproduce the image signal or an image signal recorded by another system (e.g. raster data, vector data or text data). The FDM 16 has therein-side a page memory, a scanner interface, a printer interface, and an operation and display interface to implement the control over the entire system 12 and the buffering of an image signal. FIG. 2 also shows a number of signals which pass between the blocks.

Figure 3:
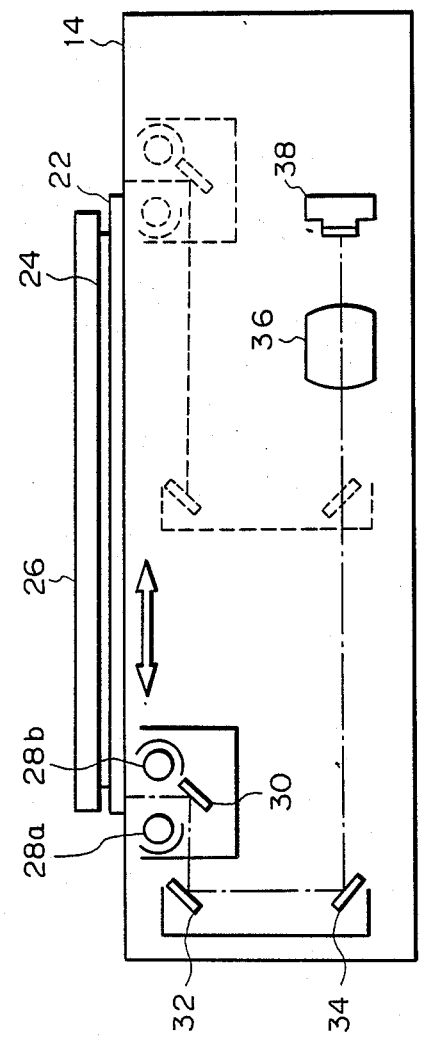
FIG. 3 is a view schematically showing an image reading arrangement.

FIG. 3 shows a specific construction of the scanner 14. An original document 24 is laid on a glass platen 22 and pressed by a cover plate 26 which completely covers the document from above. Light sources (fluorescent lamps) 28a and 28b are mounted on a carriage which is movable on and along slide rails (not shown). While the light sources 28a and 28b illuminate the document 24, a light image reflected by the document 24 is sequentially reflected by mirrors 30, 32 and 34 to become incident to a lens block 36. The lens block 36 focuses the image light onto a photoelectric transducer (CCD line sensor) 38 which constitutes a reading unit. The CCD line sensor 38 transforms the shades of color of the document 24 into an electric signal (image signal).

Figure 4A:
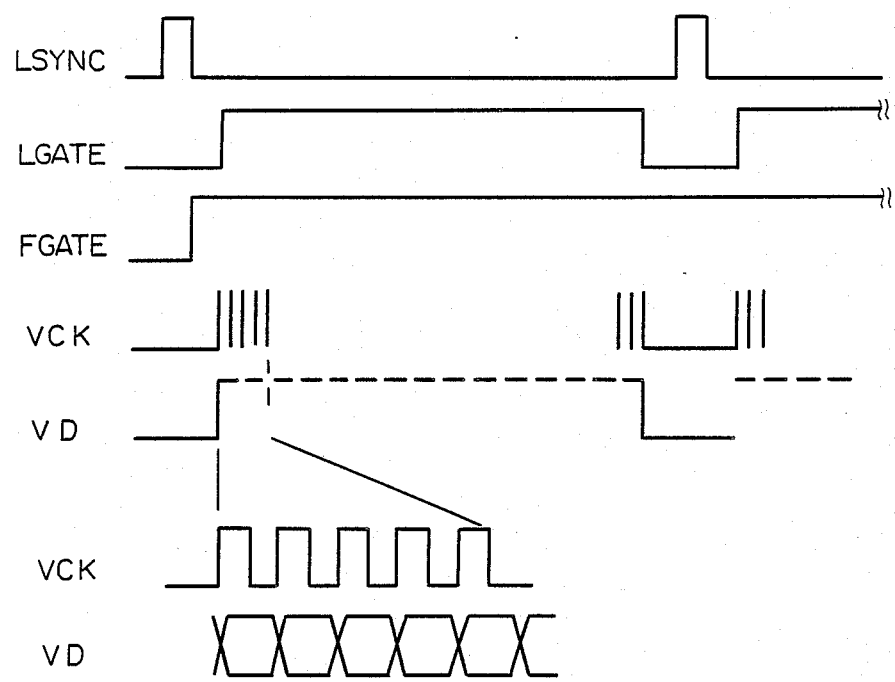
FIG. 4A is a timing chart representative of the relationship between various signals.
Figure 4B:
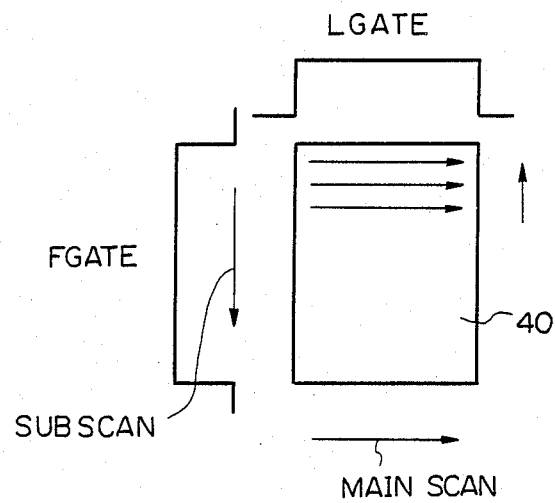
FIG. 4B is a diagram schematically showing the relationship between the orientation of a paper and a main scanning and a subscanning signal.

FIGS. 4A and 4B show a relationship between various signals which are associated with the scanner 14. In the timing chart of FIG. 4A, LSYNC and VD are respectively representative of a laser beam scanning sync signal outputted by the printer 18 and image data read (image signal) produced by sync generator 68 and clocked by a video clock VCK. The video data VD and the video clock VCK are shown in an enlarged schematic diagram in a lower part of FIG. 4A. FIG. 4B schematically shows a relationship between a paper and a main scanning signal LGATE and a subscanning signal FGATE. As shown, the signals LGATE and FGATE are respectively associated with the widthwise direction and the lengthwise direction of a paper 40.

Figure 5:
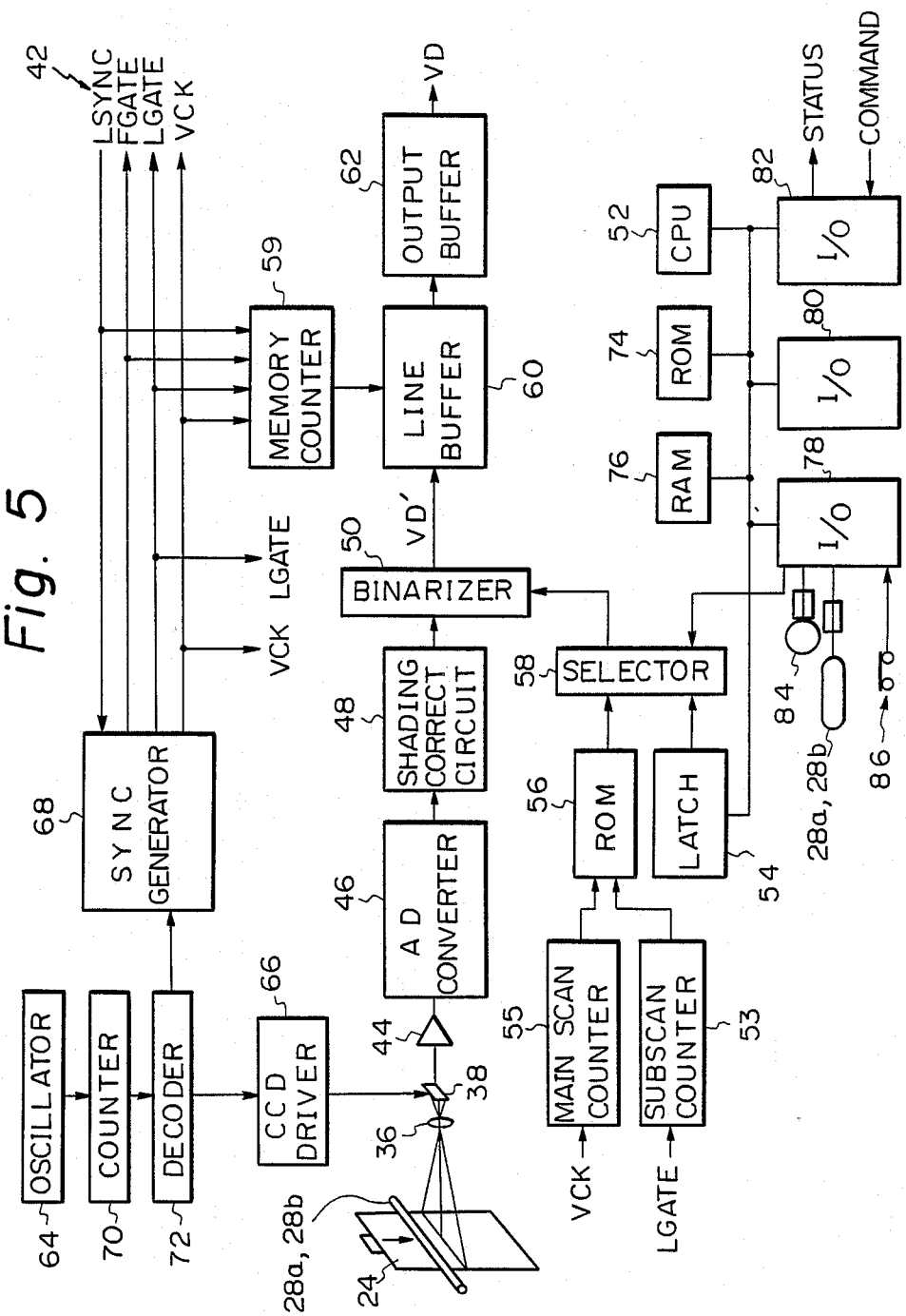
FIG. 5 is a schematic block diagram showing a circuit for processing a scanner image signal.

Referring to FIG. 5, a basic arrangement of a circuit built in the scanner 14 for processing an image signal is shown. The image processing circuit, generally 42, includes an amplifier 44 for amplifying an image signal which is outputted by the CCD line sensor 38. The image signal from the amplifier 44 is applied to an analog-to-digital (AD) converter 46 into a multi-level digital image signal on a pixel basis. The digital image signal is fed to a shading correction circuit 48 which functions to remove shading ascribable to various causes such as irregular emissions from the light sources, irregular luminance distributions of optics (mirrors and lens), and irregular sensitivity of CCDs 38. A binarizer 50 converts into definite two levels an image signal representative of characters, drawings and other similar images in which black and white are distinct. Specifically, a document select switch is provided on the operation and display board 20 (FIGS. 1 and 2) and accessible for selecting one of two different approaches: one which binarizes values computed by a central processing unit (CPU) 52 with respect to a pattern level (threshold level) which is stored in a latch circuit (random access memory or RAM) 54, and the other which is applicable to pictures and the like having tones and uses a dither pattern stored in a read only memory (ROM) 56 for binarization.

One line of image data which have been binarized on a pixel basis as stated above are applied to a line buffer 60. Assuming that the scanner 14 is of A3 size and that the resolution regarding the lengthwise feed of A4 size (210 millimeters×297 millimeters) is 400 dots per inch, the line buffer 60 is constituted by a RAM having 297×16=4752 dots or bits. The serial video signal VD from the line buffer 60 is fed to the printer 18 (FIGS. 1 and 2) via an output buffer 62. An oscillator 64 delivers its output to a CCD driver 66 adapted to drive the CCDs 38 and a sync signal generator 68 adapted to generate a sync signal for the video (pixel) signal. In FIG. 5, LSYNC is representative of a laser beam position signal (scanning sync signal) associated with the printer 18. Outputs of the oscillator 64 are counted by a counter 70 whose output is in turn applied to a decoder 72. The CCD driver 66 responds to an output of the decoder 72 for generating pulses for driving the CCDs 38. In response to the output of the decoder 72, the sync generator 68 generates the video clock VCK in synchronism with the pixels, a main scanning sync signal LGATE associated with the main scanning direction, and a subscanning sync signal FGATE associated with the subscanning direction. The signals VCK, LGATE and FGATE are fed through a memory counter 59 to the line buffer 60.

The CPU 52 is operated according to a control program which is stored in a ROM 74. Connected to the CPU 52 are a working memory RAM 76, input/output (I/O) ports 78, 80, 82 and 82, etc. The CPU 52 and the I/O ports 78 to 82 cooperate to control the entire scanner 14. More specifically, the I/O port 78 is assigned to the on/off control of actuators such as an actuator for the lamps 28a and 28b, and the sensing of sensors 86 which include a home position switch and a document sensor. The I/O port 82 serves as an interface for communicating with a control circuit which is built in the FDM 14, performing parallel data transfer by a handshake system. The video clock VCK and the main scanning sync signal LGATE are fed through a main scan counter 55 and a subscan counter 53 to the ROM 56, respectively.

Figure 6:
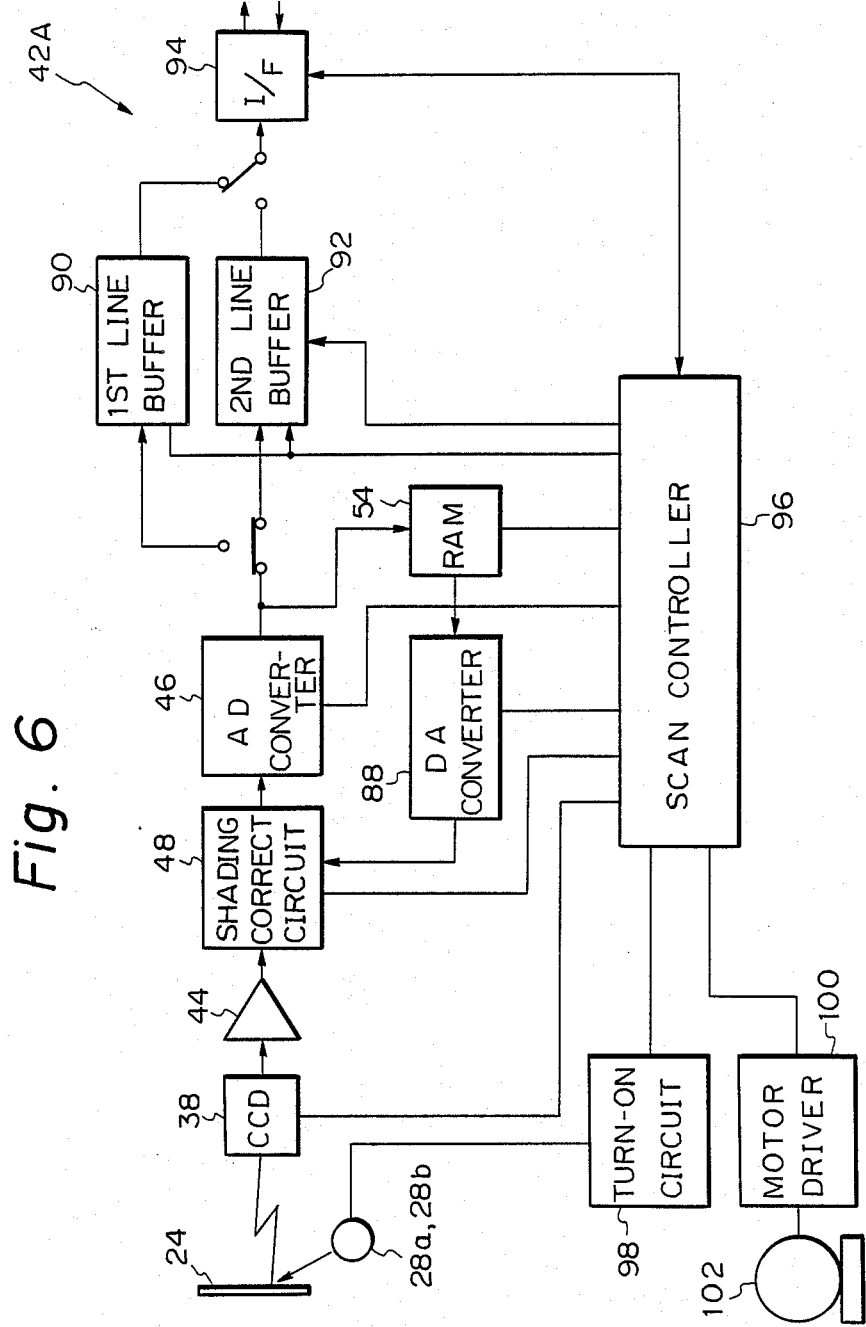
FIG. 6 is a schematic block diagram similar to FIG. 5, showing an alternative circuit for processing a scanner image signal.

FIG. 6 shows another specific construction of the circuit for processing an image signal which is outputted by the scanner 14. The image signal processing circuit 42A also includes the amplifier 44 for amplifying an image signal from the CCD line sensor 38, the shading correction circuit 48, and the AD converter 46 for outputting a multi-level digital image signal. For the shading correction as discussed with reference to FIG. 5, the lamps 28a and 28b are turned on immediately after the scanner 14 has been powered, the CCD line sensor 38 receives light which is reflected by a reference white plate, the AD converter 46 converts the resulting output of the CCD line sensor 38 into a digital signal, and the levels of the digital signal are sequentially stored in the RAM 54. The levels stored in the RAM 54 are transformed by a DA converter 88 into an analog signal and fed to the shading correction circuit 48. Also shown in FIG. 6 are a first line buffer 90, a second line buffer 92, a scanner interface (I/F) 94, a scanner control 96, a lamp turn-on circuit 98, a motor driver 100, and a motor 102 for driving the optics.

Figure 7:
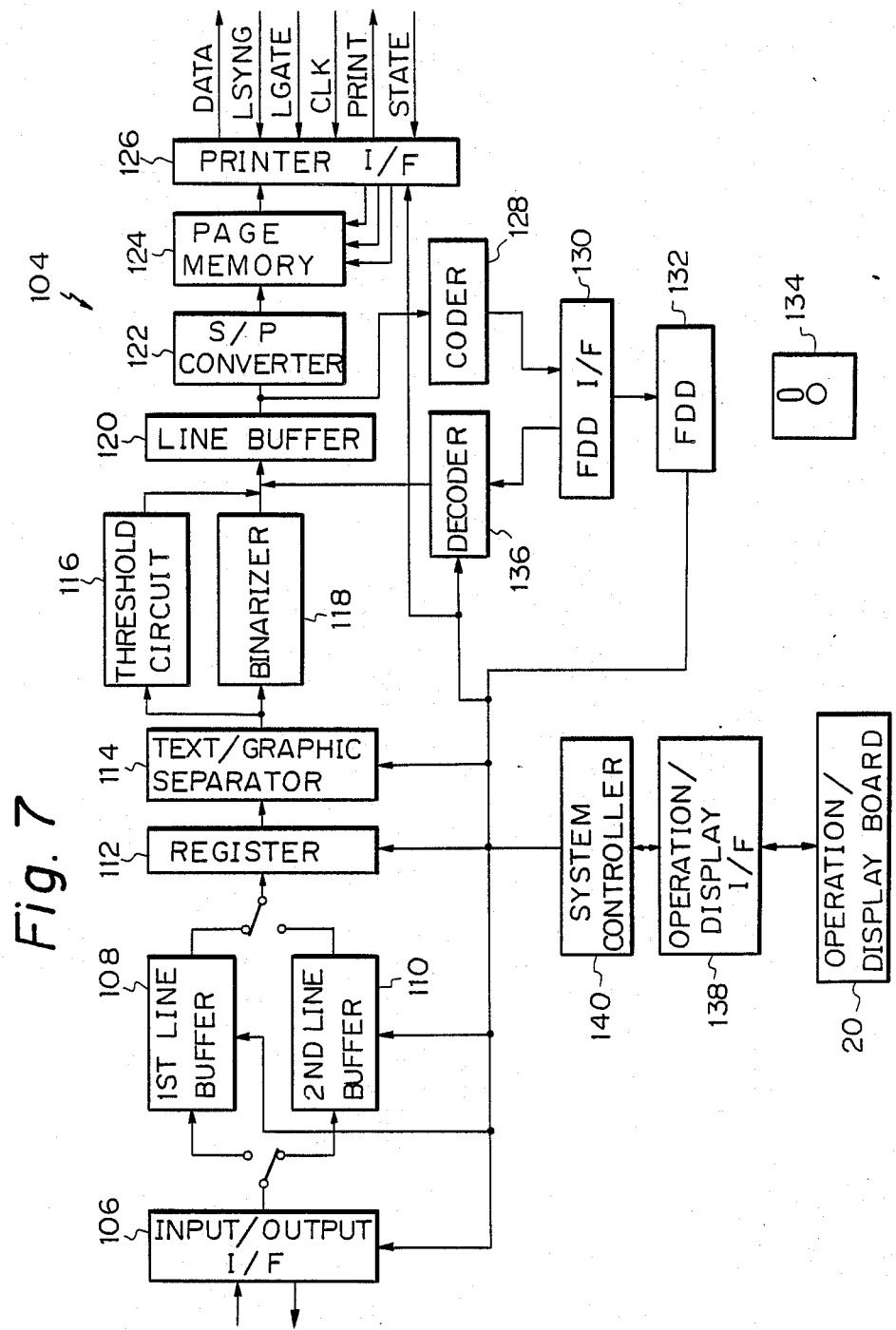
FIG. 7 is a schematic block diagram showing a specific construction of an image processing circuit.

Referring to FIG. 7, a specific construction of the image processing circuit is shown. As shown, the image processing circuit 104 includes an input/output I/F 106, a first line buffer 108, a second line buffer 110, a register 112, a text/graphic separator 114, a threshold circuit 116, a binarizer 118, a line buffer 120, a parallel-to-serial (P/S) converter 122, a page memory 124 serving as data store means, a printer I/F 126, a coder 128, a floppy disk drive (FDD) I/F 130, an FDD 132 for driving a floppy disk (FD) 134, a decoder 136, an I/F 138 associated with the operation and display board 20, and a system controller 140. In a usual copy mode, an image from the scanner 14 is developed in the page memory 124 in a bit map and then fed to the printer 18 to produce a hard copy. The coder 128 codes and thereby compresses image data outputted by the scanner 14, the compressed image data being written in the floppy disk 134. The image data stored in the floppy disk 134 are read out and expanded by the decoder 136 to become the original image data and then developed in the page memory 124 in a bit map.

The FDM 16 is constructed and operated as follows.

Figure 8:
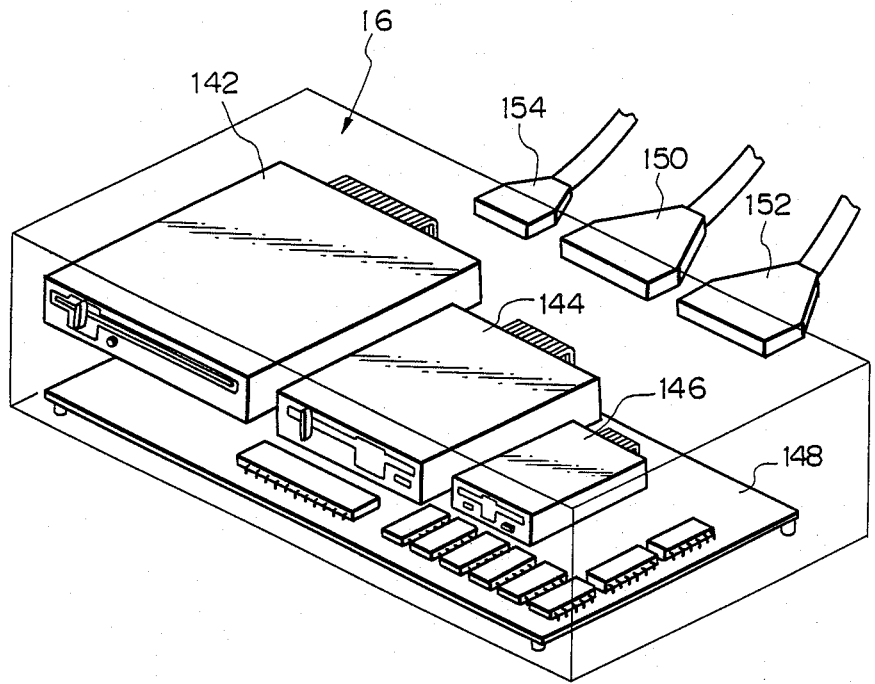
FIG. 8 is a schematic view showing a floppy disk memory.

Referring to FIG. 8, the FDM 16 is shown as comprising an 8-inch FDD 142, a 5.25-inch FDD 144, and a 3.5-inch FDD 146 by way of example. Alternatively, the FDM 16 may be loaded with one or more floppy disk devices having the same size, if desired. Also included in the FDM 16 are an electronic control circuit 148, an interface connector/cable 150 connected to the scanner 14, an interface connector/cable 152 connected to the printer 18, and an interface connector/cable 154 connected to the operation and display board 20.

Figure 9:
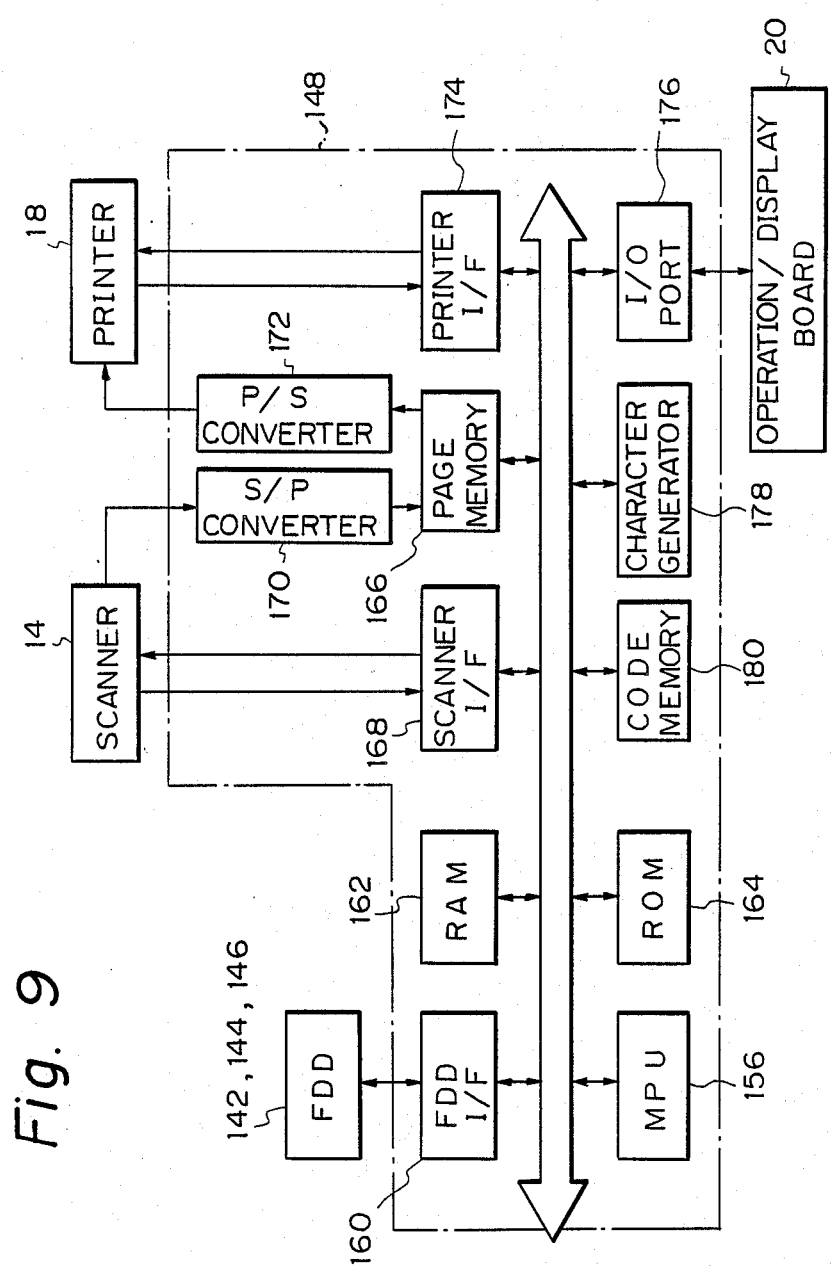
FIG. 9 is a schematic block diagram showing a control circuit.

FIG. 9 shows a control circuit built in the FDM 16. Basically implemented as a common microcomputer system, the control circuit controls each periphery by using a bus. In FIG. 9, the reference numeral 148 corresponds to the electronic control circuit 148 of FIG. 8. A microprocessor (MPU) 156 feeds a data signal, an address signal and a control signal to a bus 158. Physical controls (reading and writing) over the FDDs 142, 144 and 146 are effected via an FDD I/F 160. A working RAM 162 is operated by the MPU 156. A ROM 164 stores a program for controlling the FDDs 142, 144 and 146, printer 18, and page memory 166. A scanner I/F 168 is provided for controlling the operation of the scanner 14 and implemented by a parallel data interface. Data read by the scanner 14 are routed though an S/P converter 170 and not through the scanner I/F 168. Data from the S/P converter 170 are developed in the page memory 166 which has a capacity large enough to accommodate an output paper of the printer 18 in a full-dot image. Image data read out of the page memory 166 are transferred to the printer 18 via a parallel-to-serial (P/S) data converter 172. A printer I/F 174 is adapted for the operations of the printer 18 (e.g. print start and status read) and implemented as a parallel data interface. The printer I/F 174 is connected to the operation and display board 20 by an I/O port 176. Further included in the control circuit are a character generator 178 and a code memory 180 for storing vector data which are produced by the vector conversion of raster data developed in the page memory 166 and for storing vector data fed from a floppy disk.

Figure 10:
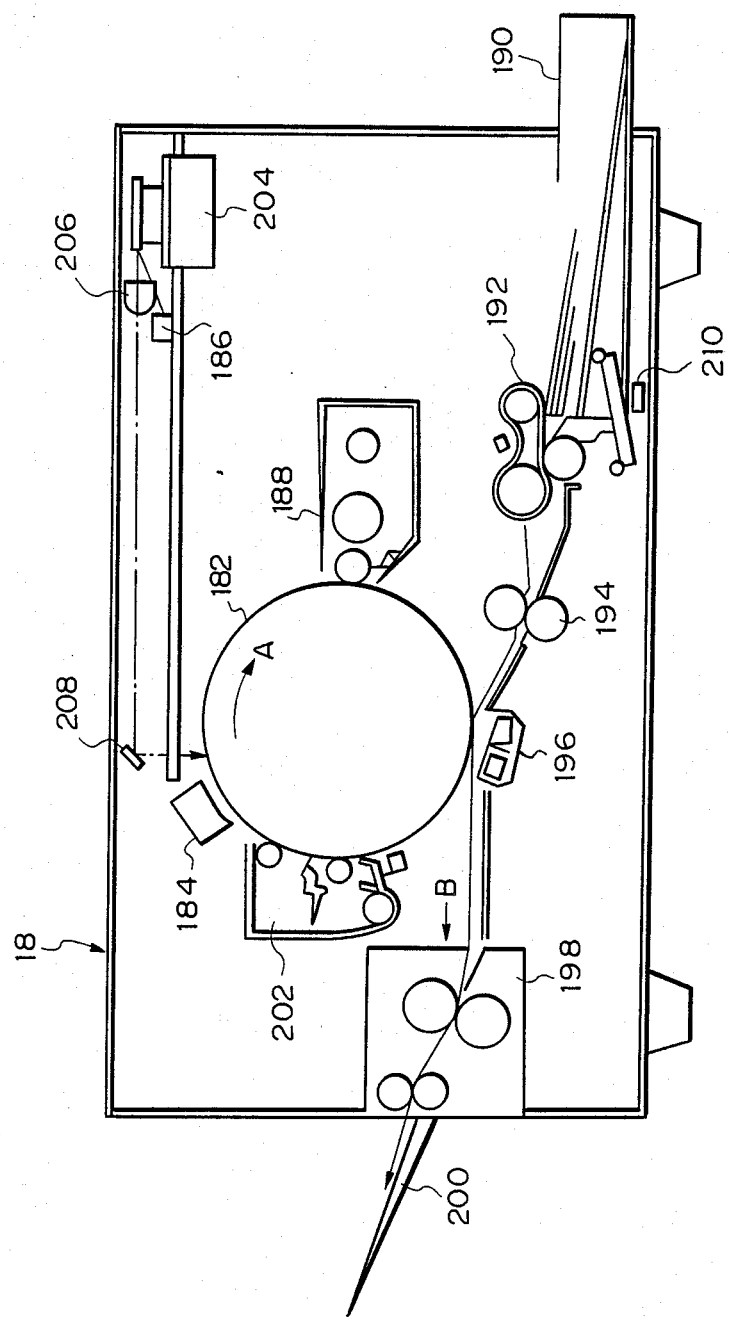
FIG. 10 is a view schematically showing a laser printer.

Referring to FIG. 10, a laser printer representative of the printer 18 and installed in the copying machine 10 is shown. A photoconductive drum 182 is rotated as indicated by an arrow A, charged by a charger 184, and exposed to an image produced by a laser 186 to form an electostatic latent image. The latent image on the drum 182 is developed by toner which is supplied from a developing unit 188. A paper is fed from a cassette 190 by a paper feed section 192 and then driven by a register roller 194 at such a timing that the leading edge of the paper is brought into register with that of the toner image on the drum 182. When the paper is held in contact with the drum 182, a transfer charger 196 is energized to transfer the toner image from the drum 182 to the paper. The paper carrying the toner image thereon is transported in a direction indicated by an arrow B toward a fixing unit 198. After the toner image on the paper has been fixed by the fixing unit 198, the paper is driven out of the copier onto a copy tray 200. Toner remaining on the drum 182 after the image transfer is removed by a cleaning unit 202. Also shown in FIG. 10 are a polygonal mirror 204, an f-theta lens 206, a mirror 208, and a paper size sensor 210.

Figure 11:
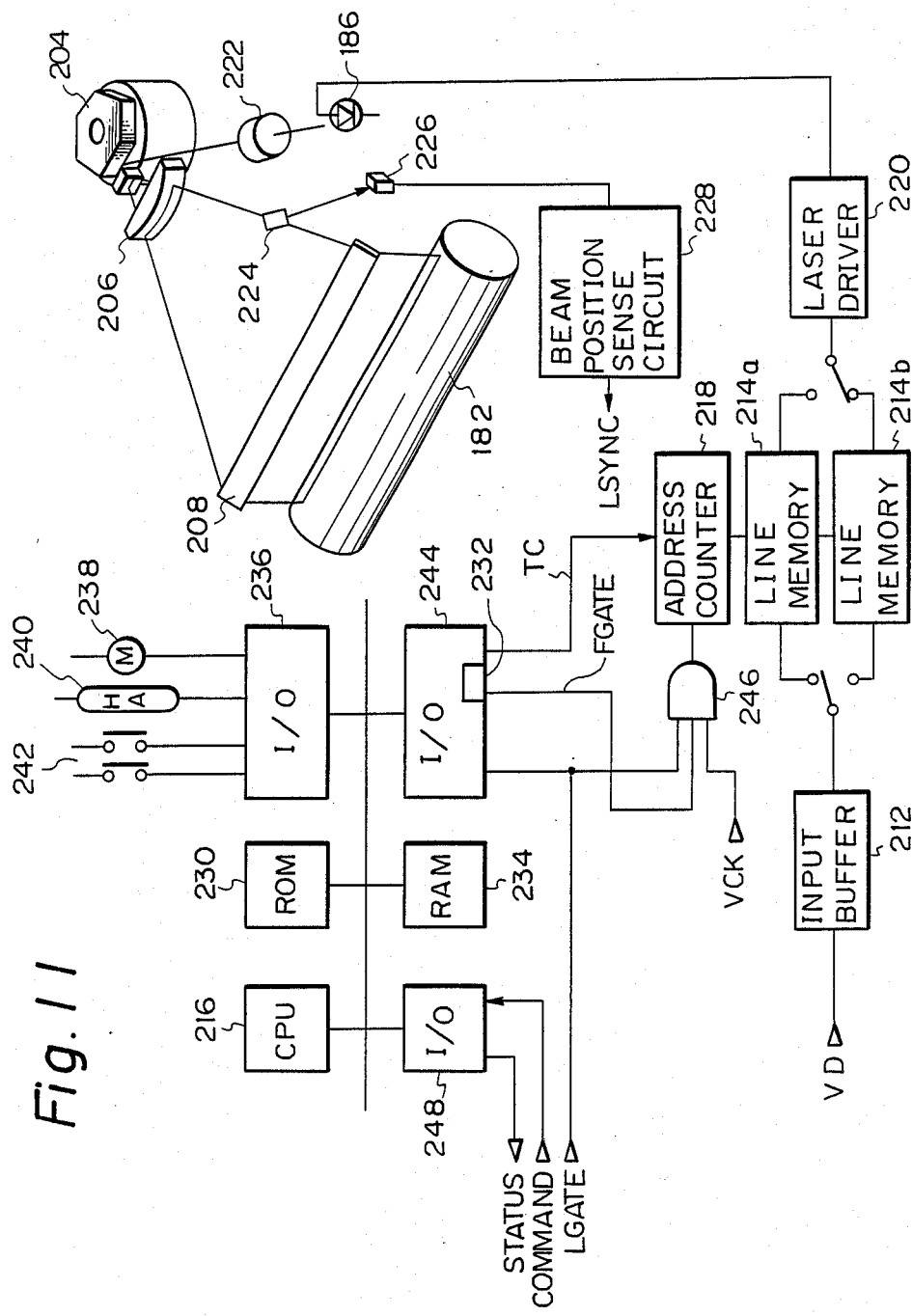
FIG. 11 is a schematic block diagram representative of a specific construction of a control circuit associated with the laser printer of FIG. 10.

Referring to FIG. 11, a specific construction of a circuit for controlling the laser printer 18 of FIG. 18 is shown. An image signal VD fed from the FDM 16 and synchronous to the sync signals LGATE, FGATE and VCK is applied to an input buffer 212 and then written in a line memory 214a or 214b. The line memories 214a and 214b are toggled by a toggle signal TC which is fed thereto from a CPU 216, i.e., one of the line memories 214a and 214b is held in a write condition while the other is in a read condition. An address counter 218 associated with the line memories 214a and 214b is incremented by the video clock VCK opened by the signal LGATE and is reset by the toggle signal TC, causing data to be written in and read out of the line memories 214a and 214b beginning at address zero continuously. The data read out of the memory such as the memory 214b are applied to a laser driver 220 which in turn controls the laser 186. A laser beam from the laser 186 is collimated by a collimator lens 222, then manipulated by the polygonal mirror 204 in the widthwise direction of the drum 182, then corrected by the f-theta lens 206 with respect to distortions, and then allowed to scan the drum 182.

The control circuit shown in FIG. 11 further includes a beam detecting mirror (BD mirror) 224, a beam position sensor 226, a beam position sensing circuit 228, a ROM 230 for storing control programs adapted for the control of the printer 18 and the control of an LGATE counter 232, a working RAM 234 associated with the CPU 216, an I/O port 236 to which a motor 238 for driving the printer 18, an actuator 240 for actuating a fixing heater and sensors 242 responsive to the presence/absence and rise of papers are connected, an I/O port 244 for counting input LGATE by using an LGATE counter 232 to apply FGATE to an AND gate 246 and outputting the toggle signal TC and other similar signals, and an I/O port 248 for interchanging control signals with the floppy disk I/O port 82 (FIG. 5) and the printer I/F 174 (FIG. 9). The CPU 216 is therefore operated by the ROM 230 which stores control programs as stated above. The CPU 216 informs the FDM 16 of the entry of a start and a stop command on the operation and display board 20, failures occurring in the printer 18 such as a paper jam, and a paper size selected by way of the I/O port 248.

Figure 12:
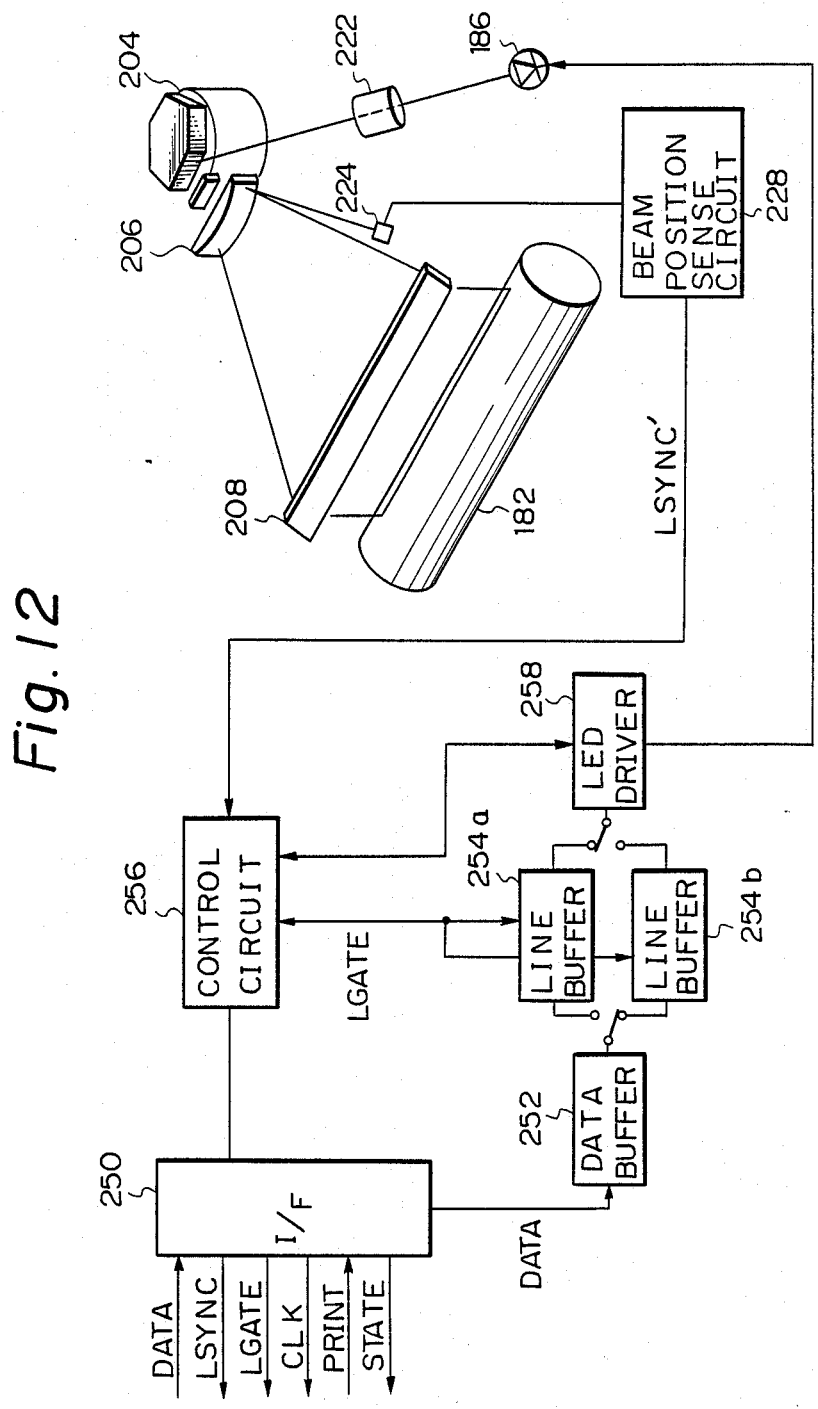
FIG. 12 is a schematic block diagram of a control circuit of a laser printer.

FIG. 12 shows an alternative construction of the control circuit for the laser printer 18. As shown an I/F 250 receives image data DATA developed in the page memory 124 of the printer I/F 126 (FIG. 7), in response to a print start signal PRINT. Fed from the I/F 250 to the printer I/F 126 are the line sync signal LSYNC, LGATE, a write clock CLK, and a status STATE. A data buffer 252 writes in one of line buffers 254a and 254b the image data which are read out of the page memory 124 (FIG. 7). The period of time during which data are written in any of the line buffers 254a and 254b is regulated by the line sync signal LGATE from a controller 256. After data have been fully written in the line buffer 254a, the subsequent data are written in the other line buffer 254b. On the other hand, data are read out of the line buffer 254a in which data have been fully written and then fed to a laser driver (LED driver) 258 for controlling the laser 186.

A laser beam from the laser 186 is collimated by the collimator lens 222, then manipulated by the polygonal mirror 204 in the widthwise direction of the drum 182, then corrected by the f-theta lens 206 with respect to distortions, and then projected onto the drum 182 by a mirror 208 to scan the drum 182. The beam sensor 224 is located outside an effective scanning range of the laser beam, and the beam position sensing circuit 228 produces a correction signal LSYNC representative of a positional deviation of the laser beam. Based on the correction signal LSYNC, the controller 256 corrects the position for starting writing data.

Figure 13:
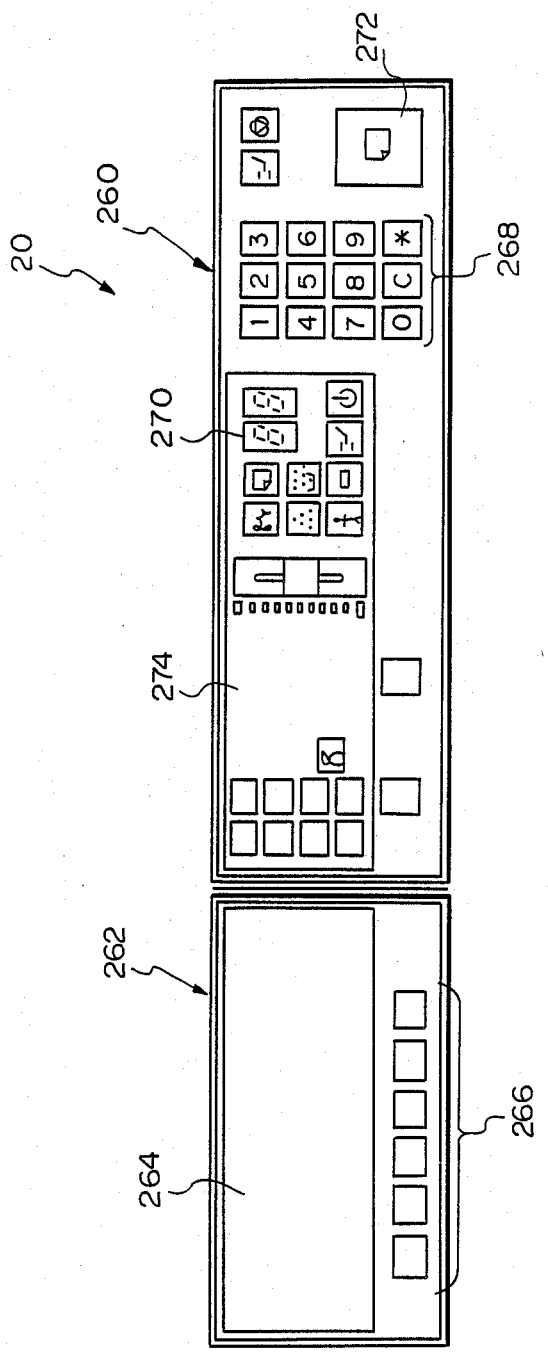
FIG. 13 is a schematic view of an operation and display board.

Referring to FIG. 13, the operation and control board 20 includes a standard operating section 260 for operating the copier 10, and a special operating section 262 provided with a dot liquid crystal (LC) display 264 and function keys 266 accessible for entering data. Adapted for "paper-to-paper copy," the standard operating section 260 includes numeral keys 268 for entering a desired number of copies, a copy number display 270, a print start key 272, and keys and indicators 274 for selecting and displaying copying conditions. The special operating section 262 is used in a copy mode for recording or reproducing data from the floppy disk 134. The function keys 266 and LC display 264 are connected to a microcomputer system via the I/O port 176 (FIG. 9) of the FDM 16 or the I/F 130 (FIG. 7). The significance of the function keys 266 and the data to be displayed on the display 264 are defined by programs which are stored in the microcomputer system.

The image processing apparatus having the above construction has three different capabilities as follows:

(1) "paper-to-paper copy" which is a conventional digital copying function and adapted to apply an image signal read by the scanner 14 to the printer 18;

(2) "paper-to-disk copy" adapted to record an image signal read by the scanner 14 in the floppy disk 134; and (3) "disk-to-paper copy" adapted to reproduce an image signal (raster data, vector data and text data being dealt with) from the floppy disk 134 to and apply them to the printer.

In the paper-to-disk copy mode, raster data read by the scanner 14 are directly converted into vector data which can be written in the floppy disk 134. On the other hand, in the disk-to-paper copy mode, data stored in the floppy disk 134 are applied to the printer 18 directly if they are raster data or after being converted into raster data if they are vector data. Further, in the paper-to-disk copy mode, image data read by the scanner 14 are subjected to code compression to be densely stored in the floppy disk 134, promoting the storage of a large amount of image data. When it is desired to print out image data read out of the floppy disk 134 on paper, i.e., in the disk-to-paper copy mode, the compressed data read out of the disk 134 are expanded to become the original image data. In addition, in the disk-to-paper copy mode, the period of time from the instant of insertion of the floppy disk 134 to the instant of print-out is reduced.

A reference will be made to FIGS. 6, 7 and 12 for describing the operation of the image processing apparatus in accordance with the present invention.

First, the procedure for scanning the document 24 to convert its images into an electrical signal will be described. As shown in FIG. 7, when the print start key on the operation and display board 20 is pressed, the resulting signal is fed to the system controller 140 via the I/F 138 which is connected to the board 20. As shown in FIG. 6, the system controller 140 delivers a control signal for operating the scanner 14 to the scanner control 96 of the scanner 14 via the I/F 94. In response to a scanner start signal, the control 96 drives the turn-on circuit 98 to turn on the lamps 28a and 28b and then drives the motor 102 to move the optics for exposure. When the optics is brought to a predetermined position, the control 96 turns off the lamps 28a and 28b and then reverses the motor 102 to return the optics to the original position, i.e. home position.

As the optics is moved as stated above, a light image from the document 24 is incident to the CCD line sensor 38. The output of the CCD line sensor 38 is amplified by the amplifier 44, then corrected by the shading correction circuit 48 as previously described, and then converted into a digital signal by the AD converter 46. The digital image signal is written in one of the line buffers 90 and 92 which is held in a write mode, as stated earlier. The image signal or image data read out of the line buffer 90 (or 92) is routed though the I/F 94 to the I/F 106 (FIG. 7) of the image processing circuit 104 to be written in the first line buffer 108 or the second line buffer 110. These line buffers 108 and 110 are also controlled by the system controller 140 such that one of them allows data to be written therein while the other is in a read mode.

When the line buffer 108 or (110) becomes full, the image data are transferred from the line buffer 108 (or 110) to the register 112 which is implemented by a memory. The text/graphic separator 114 is provided for processing the image data to discriminate characters and pictures. Specifically, it regards pixel data in which the same logical level continuously appears as being representative of a picture and pixel data in which it does not continuously appear as being representative of characters. Those data decided as being representative of characters are binarized by the binarizer 118 with respect to a particular threshold value which is selected by the threshold circuit 116. On the other hand, those data decided as being representative of a picture is binarized by the binarizer 118 by using a dither method, a submatrix method or similar quasi-halftone processing method. The resulting two-level data are written in the line buffer 120 and then converted into serial data by the P/S converter 122, the serial data being developed in the page memory 124. Those image data are fed from the page memory 124 to the printer 18 by way of the printer I/F 126.

As soon as the data are fully written in the page memory 124, the system controller 140 delivers a print start signal PRINT from the I/F 250 of the printer 18 of FIG. 12 to the control 256. At the same time, the signals LSYNC, LGATE and CLK are applied to the control 256. In FIG. 12, the printer 18 receives incoming image data DATA with the buffer 252 and writes them in one of the toggle type line buffers 254a and 254b. Image data are fed to the LED driver 258 from one of the line buffers 254a and 254b which has become full, e.g. line buffer 254a. In response, the LED driver 258 drives the laser 186. The laser beam issuing from the laser 186 scans the drum 182 by way of the collimator lens 222, polygonal mirror 204, f-theta lens 206, and mirror 208.

Figure 14:
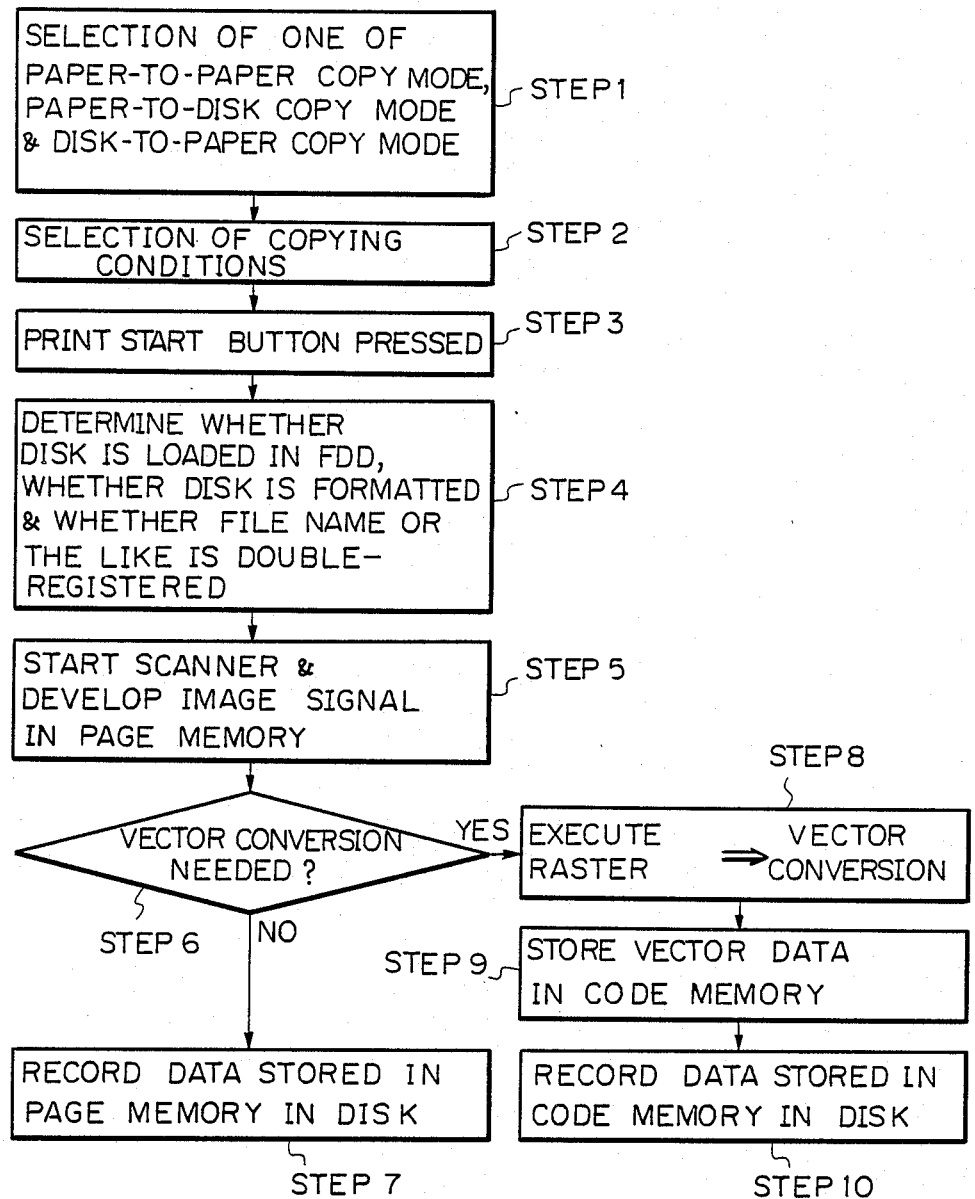
FIG. 14 is a flowchart demonstrating a paper-to-floppy disk copying procedure.

Referring to FIG. 14, the paper-to-disk copying procedure is demonstrated in a flowchart. As shown, a document to be recorded in the floppy disk 134 is loaded on the scanner 14. Then, the operation and display board 20 shown in FIG. 13 is operated to set up a "paper-to-disk copy" mode (step 1), followed by the selection of copying conditions (step 2). The copying conditions may include a copying range, the kind of a floppy disk used, a file number or a file name for the identification of a file stored in the floppy disk, and whether raster data are to be copied directly or after being converted into vector data. The operation assigned to the operator ends with pressing the print start key 272 of FIG. 13 (step 3). More specifically, such copying conditions are sequentially entered on the function keys 266 of the special operating section 262 as visually guided by the LC display 264 which is connected to the ROM 164 of the FDM via the I/O port 176. As the print start key is pressed, the program checks the floppy disk via the FD I/F 160. Specifically, the program determines whether a floppy disk is loaded in the FDD, whether it has been formatted, whether the same file name or file number has been registered twice in the same floppy disk, etc. After so checking the floppy disk, the program executes read-out by the scanner 14 by way of the I/F 168. Data read by the scanner 14 are sequentially developed in the page memory 166 via the S/P converter 170 (step 5). Since the page memory 166 has a capacity large enough to accommodate one full document, the development of data in the page memory 166 is continued until the entire document has been read. Subsequently, the program determines whether the vector conversion has been selected (step 6) and, if it has not been selected, i.e., if raster data are to be printed out as they are, the content of the page memory 166 is recorded in the floppy disc (step 7). If the vector conversion has been selected, the data developed in the page memory 166 are converted into vector data by a conversion program which is stored in the ROM 164 (step 8) and then stored in the code memory 180. As soon as all the raster data are converted into vector data, the vector data are read out of the code memory 180 and recorded in the floppy disc (step 10). Such a recording operation is executed through the FD I/F 160.

Figure 15:
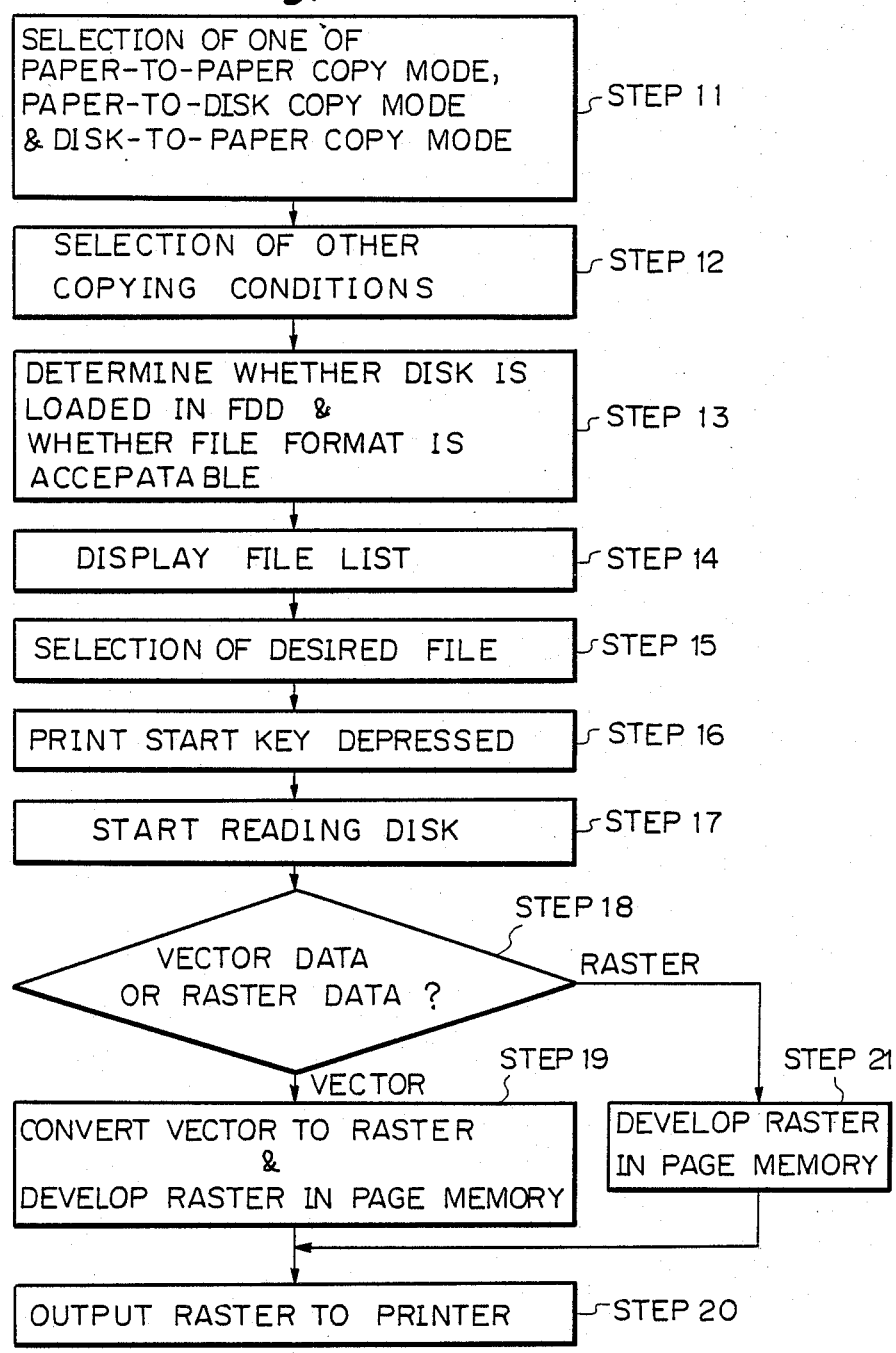
FIG. 15 is a flowchart demonstrating a floppy disk-to-paper copying procedure.

FIG. 15 is a flowchart demonstrating the "disk-to-paper copy" procedure. First, a floppy disk containing a desired file is loaded in one of the FDDs which matches the floppy disk with respect to size. Then, the operation and display board 20 is operated to select the "disk-to-paper copy" mode (step 11), followed by the selection of copying conditions such as the size of the FDD (step 12). Again, the selection of copying conditions is effected by using the function keys 266 of the special operating section 262 as visually guided by the LC display 264 which is connected to the ROM 164 of the FDM via the I/O port 176. Thereafter, the program stored in the ROM 164 checks the floppy disk through the FDD I/F 176 (step 13), e.g. whether a floppy disk is present in the floppy disk drive and whether the file format is acceptable. After checking the floppy disk as stated, the program displays a list of files which are contained in the floppy disk (step 14) while requesting the operator to select any of the files (step 15).

When the operator depresses the start key 272 after selecting a particular file (step 16), the floppy disk begins to be read (step 17). Whether the data read out of the floppy disk are vector data or raster data is determined (step 18). If the data are raster data, they are directly developed and stored in the page memory (step 21) and then fed to the printer 18 (step 20). If they are vector data, they are stored in the page memory 166 after being converted into raster data (step 19) and then delivered to the printer 18 (step 20). If the desired number of copies is two or more, the data are repeatedly fed to the printer until the desired number of copies has been reached.

The construction and operated for storing image data read by the scanner in a floppy disk as vector data will be described in detail.

In FIG. 9, two-level serial image data (raster data) read by the scanner 14 are developed in the page memory 166 via the S/P converter 170. The MPU 156 applies raster-to-vector conversion to the two-level data which are developed in the page memory 166. The algorithm for raster-to-vector conversion may be implemented by any one of various algorithms known in the art such as Freeman's chain code method, skeletonization type method which relies on sequential processing, method using a contour pair which is based on parallel processing, and linear approximation type method. A program for the raster-to-vector conversion is stored in the ROM 164. The MPU 156 converts the raster data stored in the page memory 166 into vector data via the bus 158, storing the vector data in the code memory 180. After all the raster data stored in the page memory 166 have been converted into vector data, the vector data in the code memory 180 are transferred to the FDD 142, 144 or 146 which is loaded with the floppy disk via the FDD I/F 160.

When image data in the form of vector data stored in a floppy disk as stated above are to be read out and printed out by the printer 18, the MPU 156 reads the vector data out of the floppy disk which is loaded in any of the FDDs 142, 144 and 146 via the FDD I/F 160. The vector data read out are stored in the code member 180 via the bus 158. Then, the vector data in the code memory 180 are transformed into raster data by a vector-raster conversion program which is also stored in the ROM 164, the raster data being written in the page memory 166. The raster data in the page memory 166 are fed to the printer 18 by way of the P/S converter 172 to be printed out on a paper. The algorithm for such vector-to-raster conversion depends upon the structure of vector data. For example, when all the drawings are represented by linear vectors, the vector-to-raster conversion will be implemented by any of the digital differential analyzer, Bresenham algorithm, and other similar implementations. On the other hand, when drawings are represented by linear, circular and polygonal vectors, the conversion will further be implemented by arc generation-Bresenham algorithm, pixel operation, scan conversion or similar implementation.

It is to be noted that the code memory 180 assigned to the storage of vector data as shown in FIG. 9 may be replaced with the working RAM 162 of the MPU 156.

Since raster data are recorded in a floppy disk after being transformed into vector data as stated above, even a large amount of data including drawings can be accommodated in a single floppy disk and printed out as needed.

Hereinafter will be described how a large amount of data is read by the scanner 14 and stored in a floppy disk efficiently.

In FIG. 7, image data from the scanner 14 are binarized and then written in the buffer 120, as previously stated. The data in the buffer 120 are compressed by the coder 128 and then transferred to the floppy disk 134 via the FDD 132. The coder 128 may be implemented by any of known coding methods such as an MH method and an MR method. In this manner, the image data are stored in the floppy disk together with identification data, i.e. a file name. If desired, the data may be developed in the page memory 124, then read out of the page memory to be coded, and then inputted in a floppy disk.

To cause the image data stored in a floppy disk to be printed out by the printer 18, a floppy disk 134 is loaded in the FDD 132. In this condition, the function keys 266 on the special operating section 262 are manipulated to select a file read mode, whereby file numbers and file names stored in the floppy disk 134 appear on the display 264. Then, the number assigned to desired one of the files is entered on the numeral keys 268 of the standard operating section 260. When the print start key 272 is pressed, the FDD 132 reads out the designated data out of the floppy disk 134. The data read out are expanded by the decoder 136 and then written in the buffer 120. The data in the buffer 120 are converted into serial data by the P/S converter 122 to be written in the page memory 124. As soon as the data in the floppy disk 134 runs out, the data reading operation is ended. Again, the image data fed from the floppy disk 134 to the page memory 124 are transferred to the printer 18 to be printed out on paper.

Referring to FIG. 16, there is shown a procedure for reducing the interval between the instant of insertion of a floppy disk and the instant of print-out of data in the disk-to-paper copy mode. First, a floppy disk storing a file which should be printed out on a paper is loaded in one of the FDDs which matches the disk with respect to size, and then the operation and display board 20 is operated to select the disk-to-paper copy mode (step 31). In this condition, various copying conditions such as the desired number of copies and the FDD size selected are entered (step 32) as guided by the program which is stored in the ROM 164 of the FDM, as stated earlier. After all the copying conditions have been set, the program stored in the ROM 164 determines if the floppy disk is present in the FDM, whether the file format of the disk is acceptable, etc. (step 33). After so checking the floppy disk, the program displays a list of files which are stored in the floppy disk so as to request the operator to select one of them (step 34). In this instance, if the files are text files, the first pages of all the files are read out and the text data are written in the page memory 168 until the page memory 168 becomes full (step 35). Here, it is important that file selection processing be executed simultaneously with the storage of text data in the page memory 168, because disenabling the operator's access while the development of text data in the page memory 166 is under way is undesirable from the operability standpoint. The last file in the floppy disk is developed in the page memory 166 first, taking account of the fact that the last file is often the latest file.

The file to be copied is decided at the instant when the print start key 272 is pressed after the selection of a file. Hence, the text data of that file which have already been stored in the page memory 166 are transferred to the working RAM 162 (step 36) and then converted into raster data and developed. To save the time for transferring the text data from the page memory 166 to the working RAM 162, the last one of the document files may be written in the working RAM 162 beforehand when the first page of each file is developed in the page memory 166. Although not a 100% of such a time cannot be saved, the probability of saving is greatest for the previously stated reasons. As soon as the data are fully developed in the page memory 166, they are printed out to complete the copying operation (step 37). If there is any page to follow (step 38), text data of the subsequent page are transferred from the FDM to the working RAM 162 while the printer 18 is operating.

By the above sequence, the interval between the instant when text file is read out of a floppy disk and the instant when it is applied to the printer is reduced.

In summary, it will be seen that the present invention provides an image processing apparatus for a multimedia copying machine which has various advantages as enumerated below.

(1) An original document can be recorded in an external store medium (floppy disk), and data stored in the store medium can be printed out on a paper.

(2) A large amount of image data can be written in an external storage medium by raster-to-vector conversion.

(3) A document or a drawing can be readily rotated, changed in magnification, edited or otherwise processed.

(4) Vector data may be transferred from one external store medium to another to prevent the image quality from being degraded due to transfer copying.

(5) Due to the use of a laser printer, data stored in an external store medium can be printed out at a high speed and with high quality.

(6) A large amount of data can be read by a scanner, compressed by coding, stored in an external store, and printed out as needed.

(7) In an external store medium-to-paper copying mode, the interval between the instant of insertion of the store medium and the instant of print-out is reduced to enhance efficient operations.

Various modifications will become possible for those skilled in the art after receiving the teachings of the present disclosure without departing from the scope thereof.

What is claimed is:

1. An image processing apparatus comprising:
   image reader means for reading image data from an original document;
   external store means for writing the image data read by said imager reader means in an external storing medium and reading image data out of said external storing medium;
   image forming means for forming an image on a paper in response to image data which are read by said image reader means or by said external store means; and
   image control means for controlling a flow of image data between said image reader means, said external store means, and said image forming means, said image control means including a page memory capable of storing at least one page of image data in a bit pattern.
   said image control means comprising fixed store means for converting said image data and then outputting the converted data at least when image data are to be outputted from said image reader means to said external store means and when image data are to be outputted from said external store means to said image forming means, and image store means for temporarily storing said image data which are not converted when image data are read out of said external store means and converted;
   wherein said image control means controls said external store means, said image store means, said fixed store means and said image forming means such that when image data stored in said external storing medium after coding are read out by said external store means to cause said image forming means to form an image, said coded image data read out by said external store means are temporarily stored in said image store means, the converted by a first procedure which is stored in said fixed store means, then developed in said page memory, and then outputted to said image forming means.

2. An apparatus as claimed in claim 1, wherein said image control means further comprises document selecting means.

3. An apparatus as claimed in claim 2, wherein said image control means controls said external store means, said image store means and said image forming means such that, when image data stored in said external storing medium after coding are read out by said external store means to cause said image forming means to form an image, the first page of each documents stored in said external storing medium is transferred to said page memory and then the first page of one of said documents which is selected by said document selected means is transferred to said image store means.

4. An apparatus as claimed in claim 3, wherein said image control means is constructed to, when the first page of each document stored in said external storing medium is loaded in said page memory, cause the document recorded last in said external storing medium to be loaded first.

5. An apparatus as claimed in claim 1, wherein said first procedure comprises a procedure for, when the coded image data stored in said image store means are vector image data, convert said vector image data into raster image data.

6. An apparatus as claimed in claim 1, wherein said image control means further comprises a character generator.

7. An apparatus as claimed in claim 6, wherein said first procedure comprises a procedure for, when the coded image data stored in said image store means are text data, converting said text data into raster image data by referencing said character generator.

8. An apparatus as claimed in claim 3, wherein said image control means further comprises a character generator.

9. An apparatus as claimmed in claim 8, wherein said first procedure comprises a procedure for, when the coded image data stored in said image store means are text data, converting said text data into raster image data by referencing said character generator.

10. An apparatus as claimed in claim 4, wherein said image control means further comprises a character generator.

11. An apparatus as claimed in claim 10, wherein said first procedure comprises a procedure for, when the coded image data stored in said image store means are text data, converting said text data into raster image data by referencing said character generator.

12. An apparatus as claimed in claim 1, wherein said image control means further controls said external store means, said image store means, said fixed store means and said image forming means such that when image data read by said image reader means are written in said external store medium by said external store means, said image data read by said image reader means are once stored in said page memory, then coded by a second procedure which is stored in said fixed store means, then stored in said image store means, and then outputted to said external store means.

13. An image processing apparatus, comprising:
    an image reader means for reading image data from an original document;
    main storage means for storing and retrieving image data received selectively from said image reader means and from other sources;
    image forming means for reproducing an image on paper from image data received selectively from said image reader means and said main storage means;
    image control means for controlling said image reader means, main storage means and image forming means and the image data which flows there between;
    said image control means comprising converter means for selectively converting image data to be stored in said main storage means to vector form.

14. An image processing apparatus according to claim 13, wherein said converter means includes means for reconverting stored image data to raster form.

15. An image processing apparatus according to claim 13, wherein said image control means further comprises a page memory for storing one page of image data, said page memory being connected to said image forming means.

16. An image processing apparatus according to claim 13, wherein said image control means further comprises a means for separating text data from graphic data.

17. An image processing apparatus according to claim 16, further comprising binarizer means for binarizing graphic data according to a dither method and for binarizing text data based on a threshold level provided by a threshold circuit.

18. An image processing apparatus according to claim 13, further comprising a system controller for receiving instructions and controlling said image control means in response thereto, said system controller connected to an operation display board.

19. an image processing apparatus according to claim 13, wherein said image reader means produces synchronizing signals.

20. A method for storing an image of a document comprising the steps of:
   optically scanning said document to produce electrical image signals;
   developing said electrical image signals in a temporary memory;
   selectively converting said electrical image signals to vector signals;
   recording said electrical image signals and coded image signals in a main storage device.

21. A method according to claim 20, wherein said main storage device is a floppy disk.

22. A method according to claim 20, wherein said temporary memory is a page memory for storing one page at a time.

23. A method of printing an image of a document stored in memory comprising the steps of:
   retrieving the stored signals from memory which represent said document;
   determining whether the stored signals are vector data or raster data;
   developing raster data and storing said raster data in a temporary memory;
   converting vector data to raster data and storing in a temporary memory;
   printing said data stored in said temporary memory.

24. A method according to claim 23, wherein said temporary memory is a page memory for storing one page at a time.

25. A method according to claim 23, wherein said memory is a floppy disk.

* * * * *